United States Patent Office 3,332,892
Patented July 25, 1967

3,332,892
REACTION PRODUCTS OF POLYFLUOROKE-
TONES AND ETHYLENICALLY UNSATU-
RATED POLYMERS
William J. Middleton, Wilmington, Del., assignor to E. I.
du Pont de Nemours and Company, Wilmington, Del.,
a corporation of Delaware
No Drawing. Filed July 5, 1963, Ser. No. 293,126
18 Claims. (Cl. 260—2.5)

ABSTRACT OF THE DISCLOSURE

Film-forming liquid-phase reaction products having pendant hydroxyl groups of ethylenically unsaturated polymers, e.g., polybutadiene, and fluoroketones, e.g., hexafluoroacetone, and the process for preparing the same by direct interaction between the precursors.

RELATED APPLICATION

This application is a continuation-inpart of my co-pending application Ser. No. 224,211, filed Sept. 17, 1962, and now abandoned.

FIELD OF INVENTION

This invention relates to, and has as its principal objects provision of, certain novel compositions of matter and methods for the preparation of the same.

BACKGROUND AND DETAILS OF THE INVENTION

My U.S. Patent No. 3,012,995, issued Dec. 12, 1961, described and claims reaction products of diene polymers and fluorinated thioketones. The present invention provides reaction products of ethylenically unsaturated polymers and polyfluoroketones, which film-forming reaction products contain hydroxyl groups and at least 2% by weight of fluorine.

These products are obtained by reacting an unsaturated polymer, e.g., a polymer from a diene, which has a substantial number of ethylenic double bonds in the polymer chain or in hydrocarbon radicals pendent on the polymer chain with a polyfluoroketone having at least two fluorines attached to each of the carbon atoms alpha to the keto-carbonyl group. The reaction is carried out in liquid phase and desirably in an inert reaction medium.

The polymers which are reacted with polyfluoroketones, in accord with this invention, have a molecular weight in excess of 1000 and preferably 2000 or higher. Included are natural and synthetic polymers, and copolymers of dienes which contain at least about 0.03 grammole of diene components per hundred grams of copolymer. These polymers are preferably soluble in or swollen by solvents which are unreactive with the reactants, under the conditions of reaction, and have at least one ethylenic double bond per hundred chain carbons. Examples of such polymers are those obtained by polymerizing butadiene, isoprene, 2,3 - dimethylbutadiene, 2 - chlorobutadiene, 1,4-hexadiene, or the like alone or with at least one other polymerizable α-olefinic compound, e.g., ethylene, propylene, butenes, acrylonitrile, acrylic and methacrylic esters, styrene, and the like; natural rubber, balata and gutta percha; the sulfur-curable terpolymers of ethylene and at least one other α-olefin with dicyclopentadiene, which are disclosed and claimed in U.S. Patent No. 3,000,866, e.g., ethylene/propylene/dicyclopentadiene, ethylene/1-butene/dicyclopentadiene terpolymers, and the like; terpolymers of ethylene and one other α-olefin with a 2-alkylnorbornadiene, i.e., a compound of the formula:

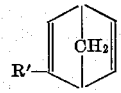

in which R' is a $C_1$–$C_{17}$ alkyl radical, e.g., ethylene/propylene/2 - methylnorbornadiene, ethylene/1 - butene/2-methylnorbornadiene terpolymers, and the like, which are disclosed and claimed in U.S. 3,063,973; terpolymers of ethylene, and at least one other α-olefin, with 5-methylene-2-norbornene, i.e., a compound of the formula:

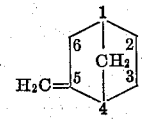

e.g., ethylene/propylene/5 - methylene - 2 - norbornene, ethylene/1 - octene/5 - methylene - 2 - norbornene terpolymers, and the like, which are disclosed and claimed in U.S. Patent No. 3,093,621; and terpolymers of ethylene and at least one α-olefin with 5-alkenyl-2-norbornenes, e.g., ethylene/1 - butene/5 - (2' - methyl - 2' - decenyl - 2 - norbornene, ethylene/1 - butene/5 - (2' - octyl - 2'-butenyl) - 2 - norbornene terpolymers, and the like, which are the products disclosed and claimed in U.S. 3,093,620.

Of particular interest are the copolymers of ethylene with 1,4-hexadiene because when such copolymers are modified with polyfluoroketones they yield elastomers which are stronger, more resilient, and have better strength after aging at elevated temperatures than the unmodified copolymers. The are also readily colored by simple immersion in water solutions of basic dyes. This very important characteristic makes possible production of gasketing which matches the color of the object on which it is used, for example, a car, refrigerator, etc. It also makes possible the production of electric cords, appliance feet, grommets, and decorative articles in a great variety of colors and shades.

The polyfluoroketone reactant is a compound of the general formula:

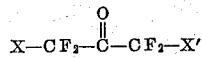

in which X and X' may be the same or different and may be hydrogen, fluorine, chlorine, bromine or polyfluoroalkyl of up to 18 carbons, or may be a polyfluoroalkylene radical of 1–5 carbons which with the

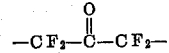

radical forms a cyclic structure of 4 to 8 carbons. Exemlary usable polyfluoroketones are perfluoroacetone, 1H, 3H - tetrafluoropropanone, 1 - chloropentafluoropropanone, perfluoropentane - 2 - one, 9 - bromoperfluorononane - 4 - one, perfluorododecane - 5 - one, 1H,7H-dodecafluoroheptane - 3 - one, 1,5 - dichloroperfluoropentane - 3 - one, 1,9 - dibromoperfluorononane - 5 - one, 1,17 - dichloroperfluoroheptadecane - 9 - one, perfluorocyclobutanone, 3 - chloro - 2,2,3,4,4 - pentafluorocyclobutanone, 3 - bromo - 2,2,3,4,4, - pentafluorocyclobutanone and the like.

The fluorinated ketones are known compounds preparable by general methods, as shown for example by Lovelace et al., "Aliphatic Fluorine Compounds," Reinhold Publishing Company, pages 182–187 (1958), and also in U.S. Patents 3,091,643, issued May 28, 1963; 3,029,252, issued Apr. 10, 1962; and 3,030,995, issued June 19, 1962.

The reaction between the polyfluoroketone and polymer takes place in the liquid phase usually as obtained by solution of the reactants in a liquid reaction medium. In some instances, especially with the higher boiling polyfluoroketones, reaction takes place when the polymer is in a swollen state or on a rubber mill. Suitable reaction media are the hexanes, heptanes, octanes, etc., cyclohexane, methylcyclohexane, diethyl ether, dibutyl ether, dioxane, tetrahydrofuran, benzene, nitrobenzene and the like. The choice of reaction medium will depend upon the particular polyfluoroketone and polymer being reacted.

There are no sharply critical process requirements for the reaction inasmuch as simple mixing of the reactants under liquid phase conditions is all that is needed. The temperatures employed range up to 250° C. but generally are from 0° C. to 200° C. Pressure may vary but generally is autogenous.

The nature of the polymer and polyfluoroketone being reacted will determine the time of reaction. In general, the time will vary from a few minutes to several hours.

The polyfluoroketone and ethylenically unsaturated polymer may be reacted in any proportions desired. Thus, the polyfluoroketone may be used in amount sufficient to introduce fluorine-containing groups equivalent in number to the number of ethylenic double bonds in the polymer or only a fraction thereof. It is, therefore, to be understood that there is nothing critical about reactant proportions.

Although the exact structure of the products of this invention is not known, infrared analysis shows the presence of hydroxyl groups. It is believed that these hydroxyl groups are present in pendent groups joined to the main polymer chain by at least one carbon atom. Thus, the products of this invention arise by addition to hydrogen from the unsaturated polymer to the oxygen of the carbonyl group to form a hydroxyl group while the polymer residue moiety, formed by abstraction of the hydrogen, adds to the carbon which carries the hydroxyl group. Preferred products of the invention are those in which the pendent groups are of the generic formula

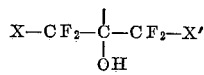

in which X and X′ are, individually, fluorine or, jointly, perfluoromethylene.

EMBODIMENTS OF THE INVENTION

The examples which follow illustrate but do not limit the invention.

*Example I*

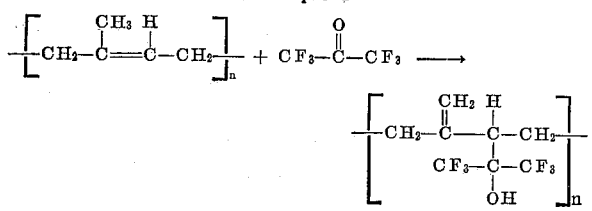

A 240-ml. Hastelloy® C (Hastelloy® is the trade name of an alloy of nickle, iron and molybdenum) pressure reactor was charged with 100 ml. of a 5% solution of crepe rubber in benzene and 500 g. of hexafluoroacetone. The charge was heated at 180° C. for 20 hours, allowed to cool to ambient temperature, and the reactor was then vented. The viscous syrup that separated from the benzene solution was washed with pentane and dried in a vacuum desiccator. There was obtained 10.8 g. of a light tan rigid foam from which a transparent film was pressed at 90° C. and 5,000 lb./sq. in. In contrast to the untreated rubber, the product was insoluble in benzene. It was soluble, however, in acetone, methanol and in 5% aqueous sodium hydroxide, all of which are non-solvents for the untreated rubber.

*Analysis.*—Calcd. for $C_9H_8F_6O$: C, 41.03; H, 3.45; F, 48.68. Found: C, 40.18; H, 3.38; F, 48.21.

*Example II*

A 240-ml. Hastelloy® C pressure reactor was charged with a solution of 20 ml. of low-molecular weight polybutadiene (52% solids in mineral spirits) in 80 ml. of benzene and 43. g. of hexafluoroacetone. The reactor was heated at 180° C. for 20 hours, allowed to cool to ambient temperature, and the reactor was then vented. The liquid in the reactor was mixed with 200 ml. pentane, the precipitate that formed was collected on a filter, and dried in a vacuum at ambient temperature for two days. There was obtained 12.0 g. of a light-brown powder, M.P. 140–150° C., which was insoluble in 10% sodium hydroxide. Analysis indicated that the product contained 40.26% fluorine, which would correspond to 58.6% combined hexafluoroacetone or 46% of the butadiene units having reacted.

The above experiment was repeated with a charge consisting of 100 ml. of 52% polybutadiene in mineral spirits and 50 g. of hexafluoroacetone. The charge was heated at 100° C. for 20 hours, and the dark gel which formed in the reactor was triturated with acetone. A light cream powder was formed, which was collected on a filter and dried in vacuum at ambient temperature. There was obtained 71 g. of a light-cream powder, which was insoluble in 5% sodium hydroxide. The infrared spectrum showed the presence of —OH. Analysis indicated 18.69% of fluorine which corresponds to 27.2% of combined hexafluoroacetone or 27% of the butadiene units having reacted.

*Example III*

A 240-ml. Hastelloy® C pressure reactor was charged with 100 ml. of a 5% solution of uncured polychloroprene (neoprene) in benzene and 30 g. of hexafluoroacetone. The charge was heated at 180° C. for 20 hours, allowed to cool to ambient temperature, and the reactor was then vented. The dark residual liquid was mixed with methanol. The tacky precipitate that formed was dried in a vacuum for two days to give 4.0 g. of a dark-brown tacky tar. The analysis indicated 5.79% of fluorine which corresponds to 8.4% of combined hexafluoroacetone.

*Example IV*

A 240-ml. Hastelloy® C bomb charged with 100 ml. of a 5% solution of uncured terpolymer (52% ethylene, 44% propylene, 3.9% hexadiene) and 25 g. of hexafluoroacetone was heated at 180° C. for 20 hours. The charge was allowed to cool to ambient temperature, and the reactor was then vented. The residual liquid was mixed with methanol, the polymer which precipitated was collected on a filter, washed with methanol, and dried at ambient temperature in a vacuum to give 4.3 g. of an off-white elastomeric polymer. Analysis indicated 2.18% of fluorine, which corresponds to 3.17% of combined hexafluoroacetone.

*Example V*

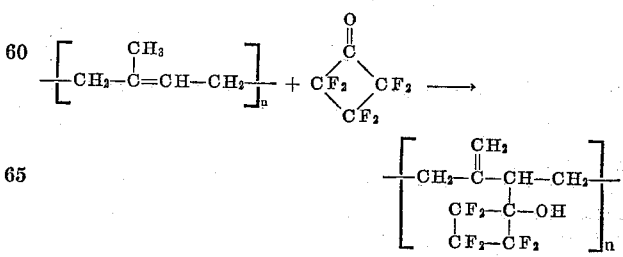

Hexafluorocyclobutanone, 7.1 g. (0.04 mole), was added to a stirred solution of 2.5 g. of crepe rubber in 50 ml. of benzene. The reaction mixture was stirred at room temperature for three hours. The polymeric material that separated was collected on a filter, washed with pentane, and dried at ambient temperature in a vacuum desiccator. There was obtained 6.2 g. of a white, rigid foam, M.P. 75–80° C. The polymer was soluble in 10% sodium hydroxide and in methanol, both nonsolvents for the untreated rubber. Analysis indicated 37% of fluorine, which corresponds to 58% of combined fluoroketone.

Example VI

A. A 1-liter Hastelloy® C pressure reactor was charged with 100 g. of hexafluoroacetone and a solution of 50 g. of crepe rubber in 700 ml. of benzene. The charge was heated at 150° C. for eight hours, allowed to cool to ambient temperature, and the reactor was then vented. The benzene was removed by evaporation at 1 mm. pressure to give 67 g. of a light-tan elastomeric product that was soluble in benzene. It was also soluble in methanol, a nonsolvent for the parent polymer. Analysis indicated 22.98% of fluorine which corresponds to 33.5% of combined hexafluoroacetone or 20.6% of the isoprene units of the polymer reacted. Infrared analysis showed the presence of —OH groups in the product.

B. Various tests were made on the product of A above as follows:

(1) A composition was made by milling 100 gr. of the product of A with 5 g. of zinc oxide, 4 g. of sulfur, 1 g. of stearic acid, and 1 g. of mercaptobenzotriazole. The mixture was placed in a mold and heated for 30 minutes at 141° C. The product obtained was a cured elastomer, the properties of which resembled those of cured natural rubber.

(2) A 10% solution of the product of A in toluene was prepared and the resulting solution was then poured on glass plates. On evaporation of the solvent there remained a clear, transparent film which was strongly adherent to the glass plate. For comparison, a similar solution of slightly degraded natural rubber was prepared and films were cast therefrom on glass. After evaporation of the solvent the films were clear but had poor adhesion to the glass.

(3) To 10% solutions of the product of A in toluene there were added catalytic quantities of cobalt acetate, cobalt naphthenate and ferric chloride and the solutions stirred to homogenize them. Flow outs of the solutions containing each of these additives were made on glass plates. The resulting films which formed on evaporation of the solvent were hard and clear and adhered strongly to the glass plates. These films were also tack-free on evaporation of the solvent.

(4) A 10% toluene solution of the product of A was flowed onto Mylar® polyester films. On evaporation of the solvent the coating on the film was tacky and was useful as a pressure-sensitive adhesive.

Example VII

A solution of 10 g. of an ethylene/1,4-hexadiene copolymer blend, dissolved in 100 ml. of perchloroethylene, was loaded into a 240-ml. Hastelloy® C pressure reactor, cooled, evacuated, and charged with 25 g. of hexafluoroacetone. The reactor was heated at 160° C. for five hours with shaking. After cooling and venting, a clear, viscous solution was poured from the reactor into 400 ml. of methanol to precipitate a white, elastomeric product. After decanting off the solvent, the product was dried at room temperature under reduced pressure (1 mm.). The product weighed 11.91 g. Analysis showed this product to contain 17.3% of fluorine, which corresponds to 25.4% by weight of hexafluoroacetone. Infrared analysis on a thin film of the product showed a strong band at 2.85 and 2.95μ for OH groups, and much absorption at 8–10μ for C–F stretching.

Ten grams of this ethylene/1,4-hexadiene/hexafluoroacetone modified polymer was compounded on a rubber mill with 0.1 g. of stearic acid, 0.5 g. of zinc oxide, 0.1 g. of Thionex® (tetramethyl thiuram monosulfide), 0.05 g. of mercaptobenzthiazole, and 0.1 g. of sulfur. The stock obtained was heated at 150° C. for 30 minutes in a mold to give cured elastomeric slabs 5″ x 1″ x 0.075″. They were subsequently cut into ¼″ strips and tested on an "Instron" machine. Cured slabs of ethylene/1,4-hexadiene used to prepare the product described in this example were prepared in an identical manner and compared by tests described in ASTM Procedure D 412+51 T. The test results are summarized below.

|  | Product from Example VII | E/1, 4-HD |
|---|---|---|
| Percent Hexafluoroacetone | 25.4 | 0 |
| $T_B$ (lb./sq. in.) | 2,500 | 970 |
| $M_{300}$ (lb./sq. in.) | 620 | 470 |
| $E_B$ (Percent) | 510 | 520 |
| Yerzley Resilience: | | |
|   25° C. (Percent) | 81.5 | 78.3 |
|   100° C. (Percent) | 86.5 | 78.3 |
| Compression Set (22 hr. at 72° C.) (Percent) | 26 | 52 |
| Tube Aging (150° C. for 3 days): | | |
|   $T_B$ (lb./sq. in.) | 1,300 | 460 |
|   $E_B$ (Percent) | 320 | 230 |

These tests show that modification of the ethylene/1,4-hexadiene copolymer with hexafluoroacetone afforded an elastomeric product which had much superior tensile strength, resilience, compression set, and tube aging (stability in air at elevated temperatures) after curing than the ethylene/1,4-hexadiene unmodified copolymer.

The copolymer blend used in the above experiment was made by mixing 40 samples of ethylene/1,4-hexadiene copolymers produced in 40 runs in a continuous atmospheric pressure reactor having a 6-liter volume. The temperature in these runs ranged from about 0 to 10° C., the residence time ranged from 19 to 45 minutes (the corresponding total flow rate ranging from 7.5 to 18 liters per hour), and the hexadiene concentration in the feed ranged from 0.75 to 0.87 mole per liter. Nitrogen and ethylene were supplied as a mixture at the following rates: 990 liters per hour of each; 617 liters per hour of each; 412 liters per hour of each; 412 liters per hour of nitrogen and 622 liters per hour of ethylene; the higher rates were employed at the shorter residence times. In general, conditions were chosen to get a 45% conversion of ethylene. The catalyst was sometimes premixed, at other times made in the reactor itself. Vanadium tris(acetylacetonate) and diisobutyl aluminum chloride were supplied at rates giving a vanadium concentration of 0.001 molar and and aluminum concentration of 0.009 molar in the reactor. In all cases the effluent from the reactor was treated with isopropyl alcohol containing 10 grams per liter of antioxidant and was thereafter washed with dilute sulfuric acid once, with water twice, and then drum dried. The copolymers employed in the blend had a 1,4-hexadiene content ranging from 29 to 35%; in general the inherent viscosity was in the range 1.3 to 1.5; one sample had a value of 1.6 and another had a value of 1.9. The Wallace plasticity (measured at 100° C.) ranged from 11 to 21.

The following is a representative preparation of a product whose properties are close to those of the entire blend used in the above experiment:

A continuous reaction was run at 5° C. in a 6-liter reactor at atmospheric pressure with a residence time of 30 minutes. A gas mixture supplying 617 liters per hour of nitrogen and 617 liters per hour of ethylene was continually introduced. 1,4-hexadiene was supplied at the rate of 9.27 gram-moles each hour as a 0.827 molar solution in tetrachloroethylene. A 0.034 molar solution of vanadium tris(acetylacetonate) in tetrachloroethylene and a 0.1552 molar solution of diisobutyl aluminum chloride in tetrachloroethylene were fed to a 60-ml. mixing vessel at 25° C. and the resulting mixture was introduced directly (after a residence time of 0.65 minute) into the reactor. Vanadium and aluminum concentrations in the reactor were 1 and 9 millimolar, respectively. Isopropyl alcohol [containing 10 grams per liter of 4,4′-thiobis(2-t-butyl-5- methyl)phenol antioxidant] was added at the rate of 75 ml. per hour to the effluent leaving the reactor at the rate of about 11.2 liters per hour. The deactivated solution was then contacted for several seconds, while strongly agitated, in a washing chamber supplied by a solution made by mixing 10 volume percent sulfuric acid and water at the respective rate of 2.5 and 22 liters per hour. The mixture was allowed to stand until separation of the layers had occurred; the aqueous layer was decanted and the polymer solution thereafter washed in a washing chamber supplied with water at the rate of 22 liters per hour. After the mixture had been allowed to stand and the resulting aqueous layer had been decanted, the polymer solution was again washed with water supplied at the rate of 22 liters per hour. Drum drying of the polymer solution gave an ethylene/1,4-hexadiene copolymer product analyzing 31% by weight of 1,4-hexadiene units, and displaying a Wallace plasticity (measured at 100° C.) of 18 and an inherent viscosity of 1.48 (measured on a solution of 0.1 gram of copolymer in tetrachloroethylene at 30° C.).

EXAMPLE VIII

A solution of 12 g. of ethylene/1,4-hexadiene copolymer containing 40% by weight of hexadiene, prepared as described subsequently, dissolved in 120 ml. of Perclene® (tetrachloroethylene; Du Pont) was loaded in a 240 ml. Hastelloy® C pressure vessel. This vessel was cooled, evacuated to 1 mm. and charged by distillation with 30 g. of hexafluoroacetone. The pressure vessel was heated at 160° C. for 8 hours under autogenous pressure (400–450 p.s.i.). After cooling and venting, the charge was drowned in 800 ml. of methanol with agitation. The rubbery product was collected on a filter, washed with methanol, and dried at room temperature at 1 mm.: weight 17.9 g. IR spectrum of a thin film showed strong bands for OH group at 2.85 and 2.95μ strong C–F absorption at 8–10μ.

The ethylene/1,4-hexadiene copolymer used in the above experiment was made as follows:

A one-liter glass flask, fitted with a glass paddle agitator, a thermometer, gas inlet and outlet tubes, and an opening to permit the introduction of liquid reagents, was charged under nitrogen at 25° C. with 765 ml. of tetrachloroethylene and 176.3 grams (2.15 gram-moles) of 1,4-hexadiene. After ethylene had been bubbled through the agitated tetrachloroethylene solution for about five minutes, the polymerization reaction was started by injecting, in turn, 0.006 gram-mole of diisobutyl aluminum chloride and 7 ml. of a vanadium tris(acetylacetonate) solution made by dissolving 0.245 gram (0.007 gram-mole) of vanadium tris(acetylacetonate) in 33 ml. of tetrachloroethylene and 17 ml. of 1,4-hexadiene. During the copolymerization reaction the temperature was 25° C.; the ethylene pressure was maintained at one atmosphere by continuously supplying excess monomer gas which visibly escaped through the bubble trap at the end of the gas outlet tube. At 10-minute intervals, 7 more ml. of the vanadium tris(acetylacetonate) catalyst solution were injected into the reactor. Eighty minutes after the reaction had been started, isopropyl alcohol was added to deactivate the catalyst. The copolymer solution was then treated in a Waring Blendor successively with 300 ml. of 10% aqueous hydrochloric acid and with two 300-ml. portions of water, 0.1 gram of 4,4'-butylidene bis(2-t-butyl-5-methyl)phenol antioxidant was introduced and the copolymer was totally isolated to a yield of 41.5 grams by evaporation of the solvent. The copolymer had an inherent viscosity of 0.87 (measured on a solution of 0.1 gram of copolymer in 100 ml. of tetrachloroethylene at 30° C.) and contained 40.5% by weight of 1,4-hexadiene units; a bromine equivalent indicated that 28% by weight of unsaturated diene units was present.

*Example IX*

A solution of 7 g. of ethylene/1,4-hexadiene copolymer containing 20% by weight of hexadiene in 120 ml. of tetrachloroethylene was placed in a 240-ml. Hastelloy® C pressure reactor. This vessel was cooled, evacuated to 1 mm. and charged with 30 g. of hexafluoroacetone. The reactor was heated at 160° C. for five hours with shaking under autogenous pressure. After cooling and venting, the contents of the reactor were poured slowly into 600 ml. of methanol with agitation. The white, elastomeric product was collected on a filter and dried at 25° C. under 1 mm. pressure. This product was cured by the process described in Example VII to a good gum stock elastomer.

The copolymer used in the above experiment was prepared following the procedure described in Example VIII.

*Example X*

A solution of 8 g. of ethylene/1,4-hexadiene copolymer containing 31% of hexadiene by weight in 120 ml. of tetrachloroethylene (Du Pont Perclene®) was loaded into a 240-ml. Hastelloy® C reactor. After cooling and evacuating, 25 g. of hexafluoroacetone was distilled into the reactor. The reactor was heated at 140° C. for 4 hours under autogenous pressure. After cooling and venting, the viscous solution was discharged from the bomb and poured into 400 ml. of methanol with agitation. The solvent was decanted off and the elastomeric product was dried at 1 mm.: weight 8.5 g.

*Analysis.*—F, 7.46; percent hexafluoracetone=11. $\eta_{inh}=1.43$ in Perclene® at 0.1% at 25° C.

*Example XI*

A solution of 12 g. of ethylene/1,4-hexadiene copolymer in 120 ml. of Perclene® was placed in a 240-ml. Hastelloy® C pressure reactor. The reactor was cooled in a solid carbon dioxide/acetone bath, evacuated to 1 mm., and charged with 30 g. of hexafluoroacetone by distillation. This charge was heated at 160° C. for five hours with shaking under autogenous pressure. After cooling and venting, 0.3 g. of a phenolic antioxidant, sold under the trade name Santowhite®, was added to the reaction solution. The charge was drowned in 800 ml. of methanol. The product was collected on a filter and dried at 1 mm.; weight 14.4 g. This product is an attractive white, elastomeric material. It contained 18.5% of fluorine or 27.2% of hexafluoroacetone by weight.

Ten grams of this product was compounded with 0.1 g. of stearic acid, 0.5 g. of zinc oxide, 0.1 g. of tetramethyl thiuram monosulfide, 0.05 g. of mercaptobenzothiazole, and 0.1 g. of sulfur. This stock was cured at 150° C. for 40 minutes in a mold to afford an elastomeric slab 1" x ¾" x 0.075". This slab was cut into ¼" strips and tested on an "Instron" machine by tests described in ASTM Procedure D 412+51 T. Slabs of ethylene/1,4-hexadiene copolymer (starting material for this example) were prepared in the same way and compared in the same tests.

|  | Product from Example XI | E/1, 4-HD Starting Material |
| --- | --- | --- |
| Tensile Break (lb./sq. in.) | 3,850 | 450 |
| Modulus 300% (lb./sq. in.) | 600 |  |
| Elongation Break | 48 | 470 |
| Yerzley Resilience: |  |  |
| 25° C. (percent) | 78.8 | 71.8 |
| 100° C. (percent) | 83.1 | 76.6 |
| Percent Hexafluoroacetone (by weight) | 27.2 | 0 |

These tests show that ethylene/1,4 - hexadiene (E/1,4-HD) modified polymers, prepared by the process disclosed below, afforded excellent cured gum elastomers, being much superior to the untreated ethylene/1,4-hexadiene copolymer. The high tensile strength and resilience of this cured product can only be matched by natural rubber and, perhaps, by synthetic cis-polyisoprene. These properties cannot be matched by other sulfur-curable synthetic elastomers.

The ethylene/1,4-hexadiene copolymer used in Examples X and XI was made as follows:

The copolymerization was carried out continuously in tetrachloroethylene at 10° C. in an atmospheric pressure reactor having a liquid volume of about 6 liters. The residence time in the reactor was 20 minutes. A gas mixture containing equal volumes of ethylene and nitrogen was introduced at the rate of 1980 liters per hour (the volume is referred to one atmosphere at 25° C.) supplying 40.2 gram-moles of ethylene per hour. 1,4-hexadiene was supplied in a tetrachloroethylene solution at the rate of 13.45 gram-moles per hour. The catalyst was formed in the reactor by continuous introduction of separate tetrachloroethylene solutions of vanadium tris(acetylacetonate) and diisobutyl aluminum chloride. The vanadium and aluminum concentrations in the reactor were 0.001 molar and 0.009 molar, respectively. The copolymer solution leaving the reactor at the rate of about 18 liters per hour was immediately contacted with isopropyl alcohol [containing 10 grams per liter of 4,4'-thiobis(2-t-butyl-5-methyl)phenol antioxidant] supplied at the rate of 75 ml./hr. The polymer solution was then strongly agitated for several seconds in a washing chamber into which was fed a dilute sulfuric acid solution made by continuously mixing 2.5 liters of 10 volume percent of sulfuric acid and 22 liters of water per hour. The mixture was then allowed to settle until the layers had separated, the aqueous layer was decanted, and the polymer solution was thereafter twice washed with about two volumes of water. The copolymer, isolated by drum drying, had 30.9% of 1,4-hexadiene units by weight and exhibited an inherent viscosity of 1.26 (measured on a solution of 0.1 gram of copolymer in tetrachloroethylene at 30° C.).

As described in the detailed examples, the products of this invention possess properties differing radically from those of the ethylenically unsaturated polymers from which the products are made. Thus, they are soluble in solvents which do not dissolve the parent polymers, and as shown in Examples VII and XI, are stronger and more resilient than the unmodified copolymers and superior in strength after aging at high temperatures to aged unmodified materials.

As illustrated in connection with Example VI, the polymers of this invention yield films which are strongly adherent to such substrates as glass, and these films are therefore useful as protective and decorative coatings. Films of the products of this invention deposited on such substrates as Mylar® polyester films and other similar substrates are tacky and the products are useful as pressure-sensitive adhesives.

The clear coatings, whether they be on rigid or flexible substrates, are resistant to aliphatic hydrocarbon solvents and thus are useful in applications where resistance to such solvent is needed. The presence of hydroxyl groups provides means for further modification, as by reaction with carboxylic acids, isocyanates, and the like, to produce products having properties designed for specific applications. Thus, the products from reaction with carboxylic acids are polyesters, and these are useful for conversion to films, fibers, coatings, and other known applications of the polyesters. The products resulting from the reaction of isocyanates are polyurethanes. These are useful in the production of foam products and in other known applications of the polyurethanes.

Since obvious modifications and equivalents in the invention will be evident to those skilled in the chemical arts, I propose to be bound solely by the appended claims.

The embodiments of the invention in which an exclusive property or privilege is claimed are defined as follows:

1. The film-forming, liquid-phase reaction product of
(1) an ethylenically unsaturated polymer having a molecular weight in excess of 1000 and at least one ethylenic double bond per hundred chain carbons selected from the group consisting of: homopolymers of butadiene, isoprene, 2,3-dimethylbutadiene, 2-chlorobutadiene and 1,4-hexadiene or copolymers of the same with at least one of ethylene, propylene, butenes, acrylonitrile, acrylic and methacrylic esters and styrene; natural rubber, gutta percha and balata; ethylene/propylene/dicyclopentadiene and ethylene/1-butene/dicyclopentadiene terpolymers; ethylene/propylene/2 - methylnorbornadiene, ethylene/1 - butene/2-methylnorbornadiene, ethylene/propylene/5-methylene-2-norbornene and ethylene/1 - octene/5-methylene-2-norbornene terpolymers; and ethylene/1-butene/5-(2'-methyl-2'-decenyl)-2-norbornene and ethylene/ - butene/5 - (2' - octyl - 2' - butenyl) - 2-norbornene terpolymers; with
(2) a ketone of the formula

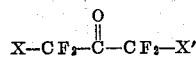

wherein X and X' are selected from the group consisting, individually, of hydrogen, fluorine, chlorine, bromine and polyfluoroalkyl of up to 18 carbons and, jointly, of polyfluoroalkylene of 1–5 carbons, said reaction product containing pendent hydroxyl groups and at least 2% by weight of fluorine.

2. The product of claim 1 wherein the pendent hydroxyl group is within the structure

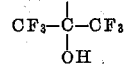

3. The product of claim 1 wherein the pendent hydroxyl group is within the structure

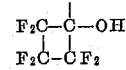

4. The product of claim 1 wherein hexafluoroacetone is reacted with rubber.

5. The product of claim 1 wherein hexafluoroacetone is reacted with polybutadiene.

6. The product of claim 1 wherein hexafluoroacetone is reacted with polychloroprene.

7. The product of claim 1 wherein hexafluoroacetone is reacted with an ethylene/1,4-hexadiene copolymer.

8. The product of claim 1 wherein hexafluorocyclobutanone is reacted with rubber.

9. The process of producing a product of claim 1 which comprises
reacting, in liquid phase and at a temperature of 0°–250° C.,
(1) an ethylenically unsaturated polymer having a molecular weight in excess of 1000 and at least one ethylenic double bond per hundred chain carbons selected from the group consisting of: homopolymers of butadiene, isoprene, 2,3-dimethylbutadiene, 2-chlorobutadiene and 1,4-hexadiene or copolymers of the same with at least one of ethylene, propylene, butenes, acrylonitrile, acrylic and methacrylic esters and styrene; natural rubber, gutta percha and balata ethylene/propylene/dicyclopentadiene and ethylene/1 - butene/dicyclopentadiene terpolymers; ethylene/propylene/2-methylnorbornadiene, ethylene/1-butene/2-methylnorbornadiene, ethylene/propylene/5 - methylene-2-norbornene and ethylene/1 - octene/5-methylene-2-norbornene terpolymers; and ethylene/1-butene/5-(2'-methyl-2'-decenyl)-2-norbornene and ethylene/1 - butene/5-(2'-octyl-2'-butenyl)-2-norbornene terpolymers;

with
(2) a ketone of the formula

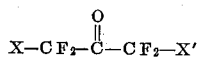

wherein X and X' are selected from the group consisting, individually, of hydrogen, fluorine, chlorine, bromine and polyfluoroalkyl of up to 18 carbons and, jointly, or polyfluoroalkylene of 1–5 carbons.

10. The process of claim 9 wherein hexafluoroacetone is reacted with rubber.

11. The process of claim 9 wherein hexafluoroacetone is reacted with polybutadiene.

12. The process of claim 9 wherein hexafluoroacetone is reacted with polychloroprene.

13. The process of claim 9 wherein hexafluoroacetone is reacted with an ethylene/1,4-hexadiene copolymer.

14. The process of claim 9 wherein hexafluorocyclobutanone is reacted with rubber.

15. A film formed from a polymer of claim 1.
16. A film formed from a polymer of claim 4.
17. A film formed from a polymer of claim 7.
18. A foam formed from a polymer of claim 4.

References Cited
UNITED STATES PATENTS

| | | | |
|---|---|---|---|
| 3,012,995 | 12/1961 | Middleton | 260—768 |
| 3,067,173 | 12/1962 | Barney | 260—63 |

OTHER REFERENCES

Coleman et al. U.S. Atomic Energy Comm. WADC–TR–58–3, 26 pp. (1958), pp. 2–9 and 13–20 relied on.

England, Journal of American Chemical Society, 83, 2205–2206 (May 5, 1961).

WILLIAM H. SHORT, *Primary Examiner.*

L. M. PHYNES, *Assistant Examiner.*